Nov. 11, 1924.
A. F. PARKER
1,514,923
MACHINE FOR BUILDING CONCRETE ROADS
Filed Feb. 2, 1920   9 Sheets-Sheet 9
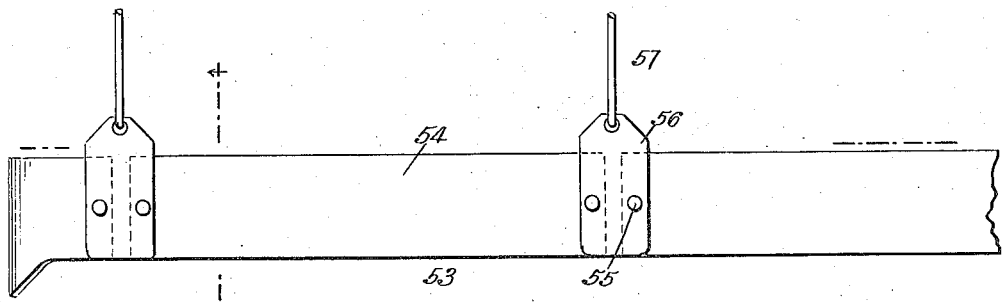
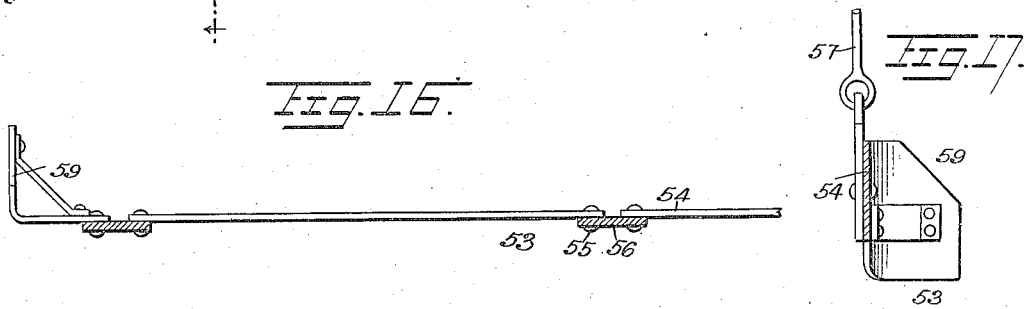
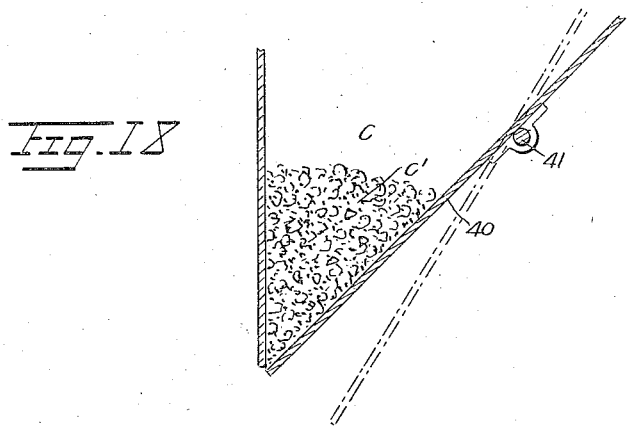
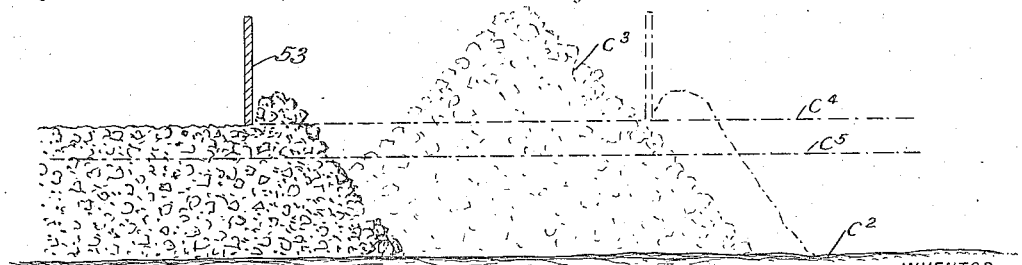
WITNESSES
INVENTOR
A. F. Parker
BY
ATTORNEYS Patented Nov. 11, 1924.

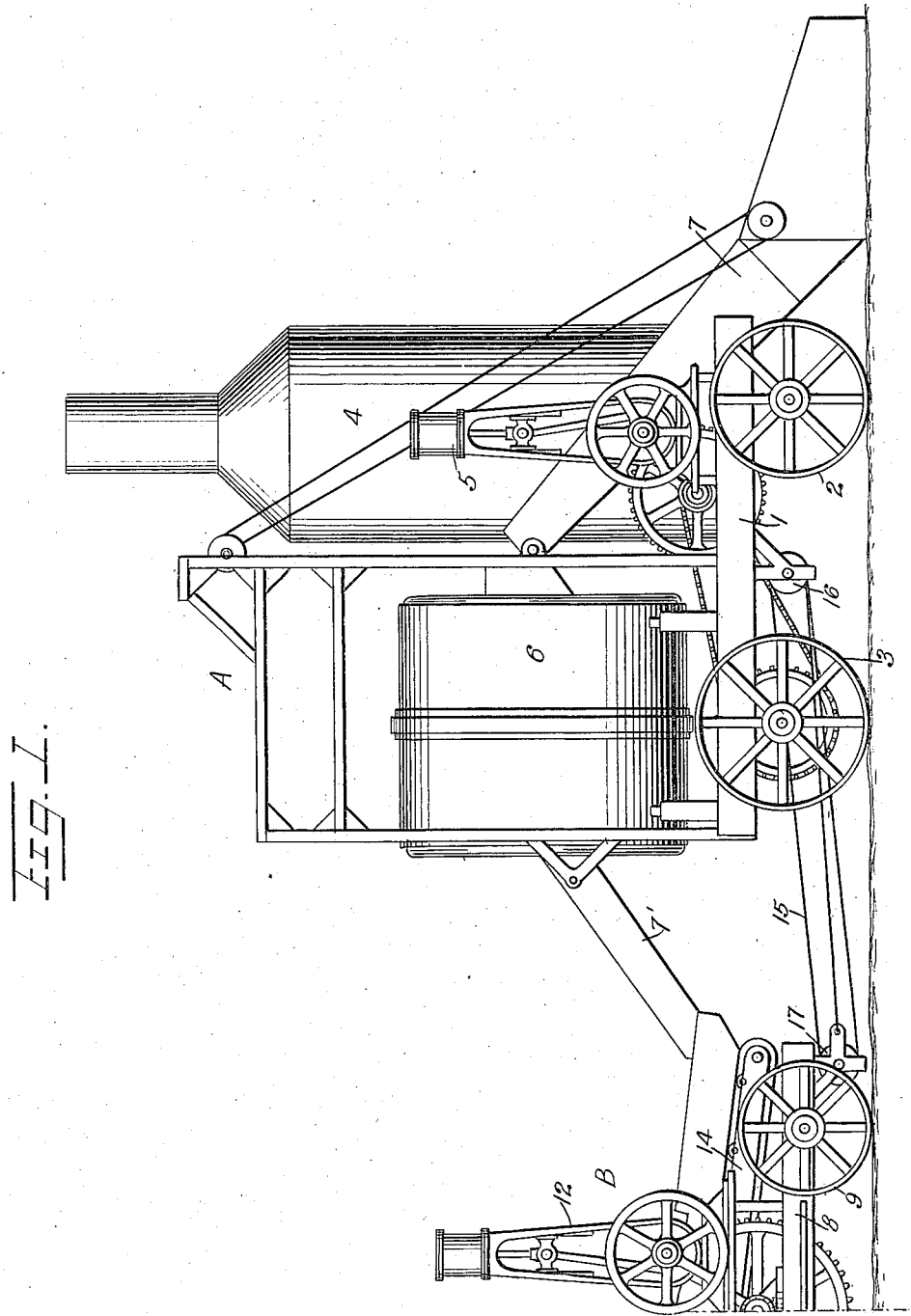

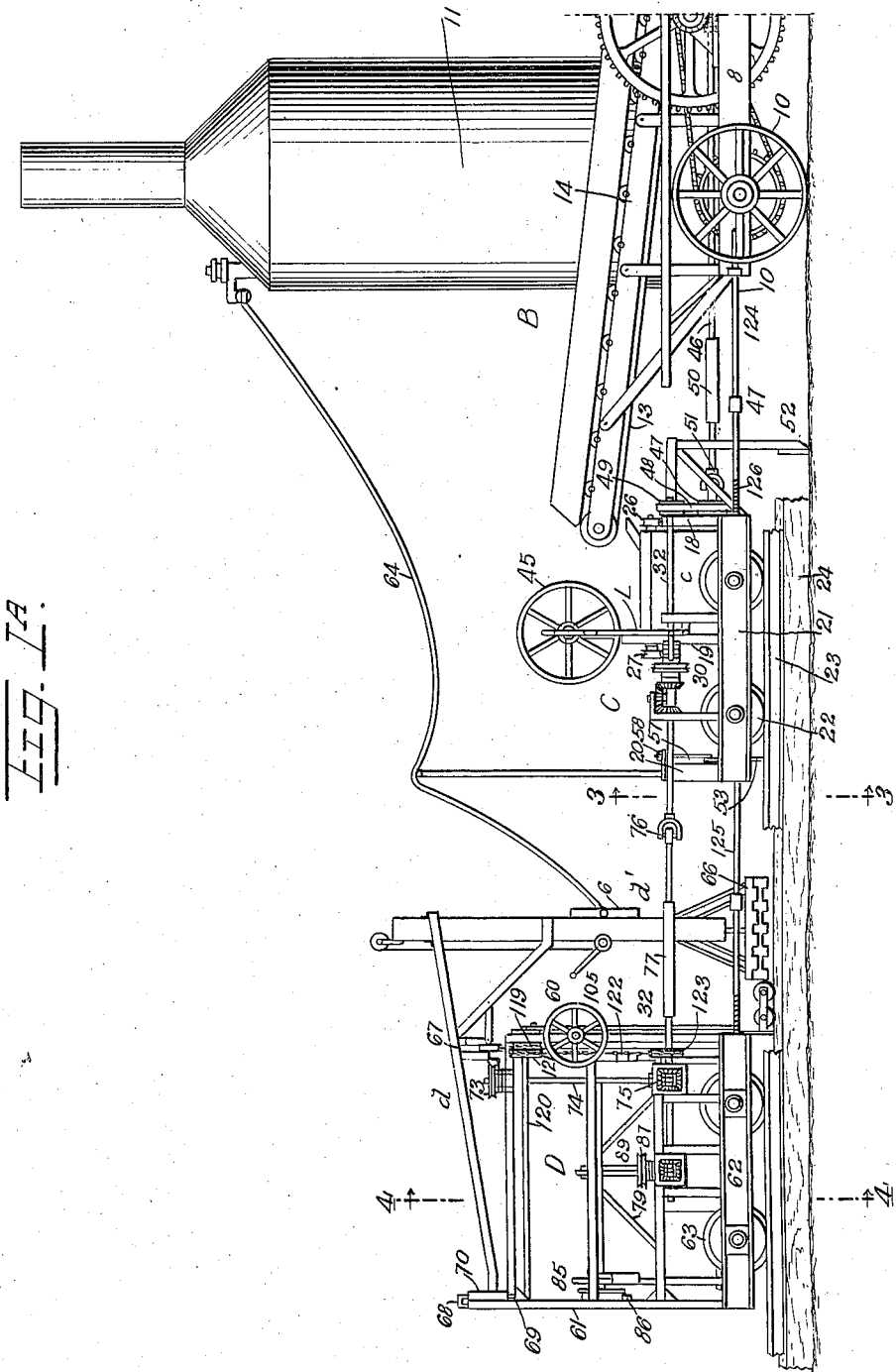

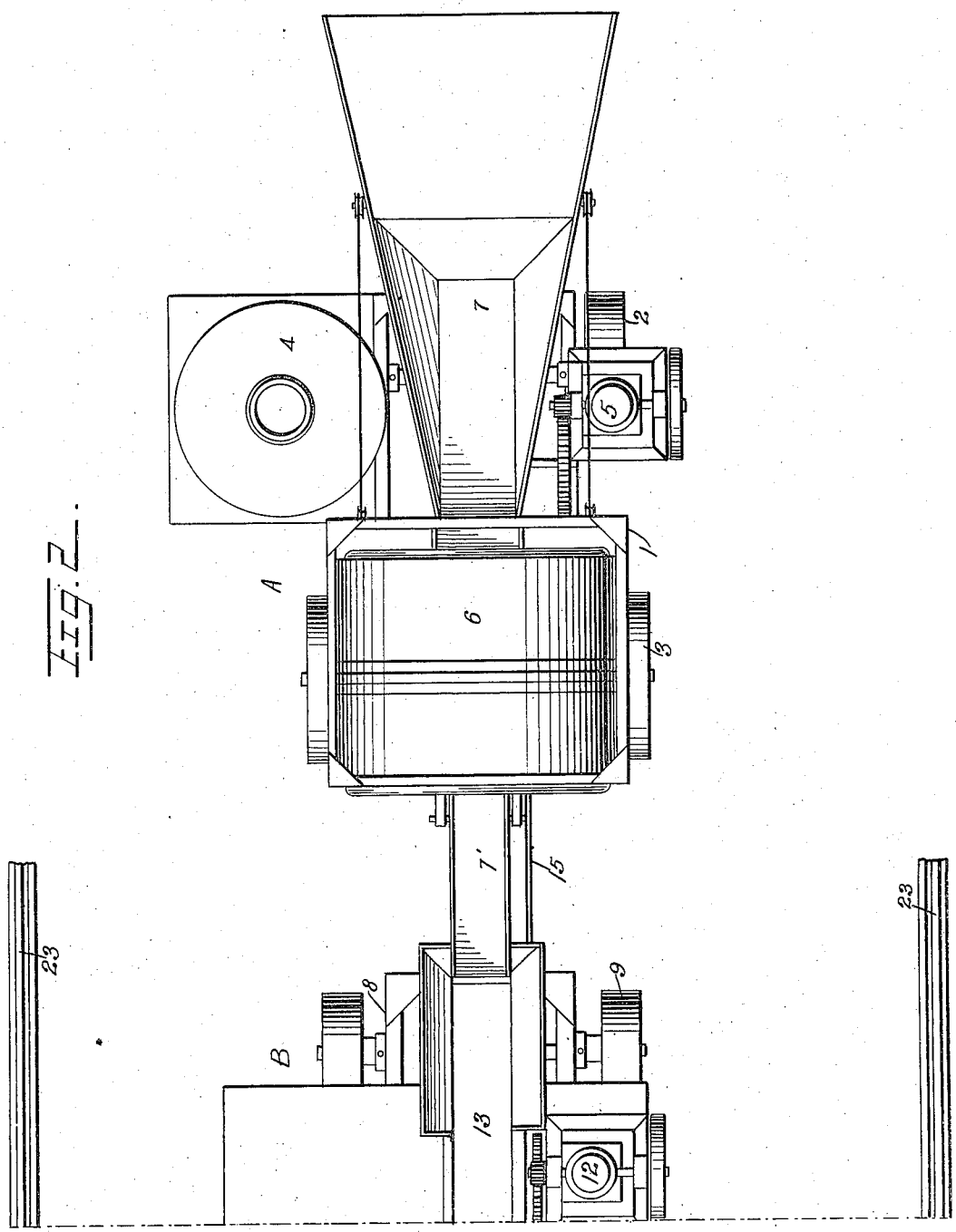

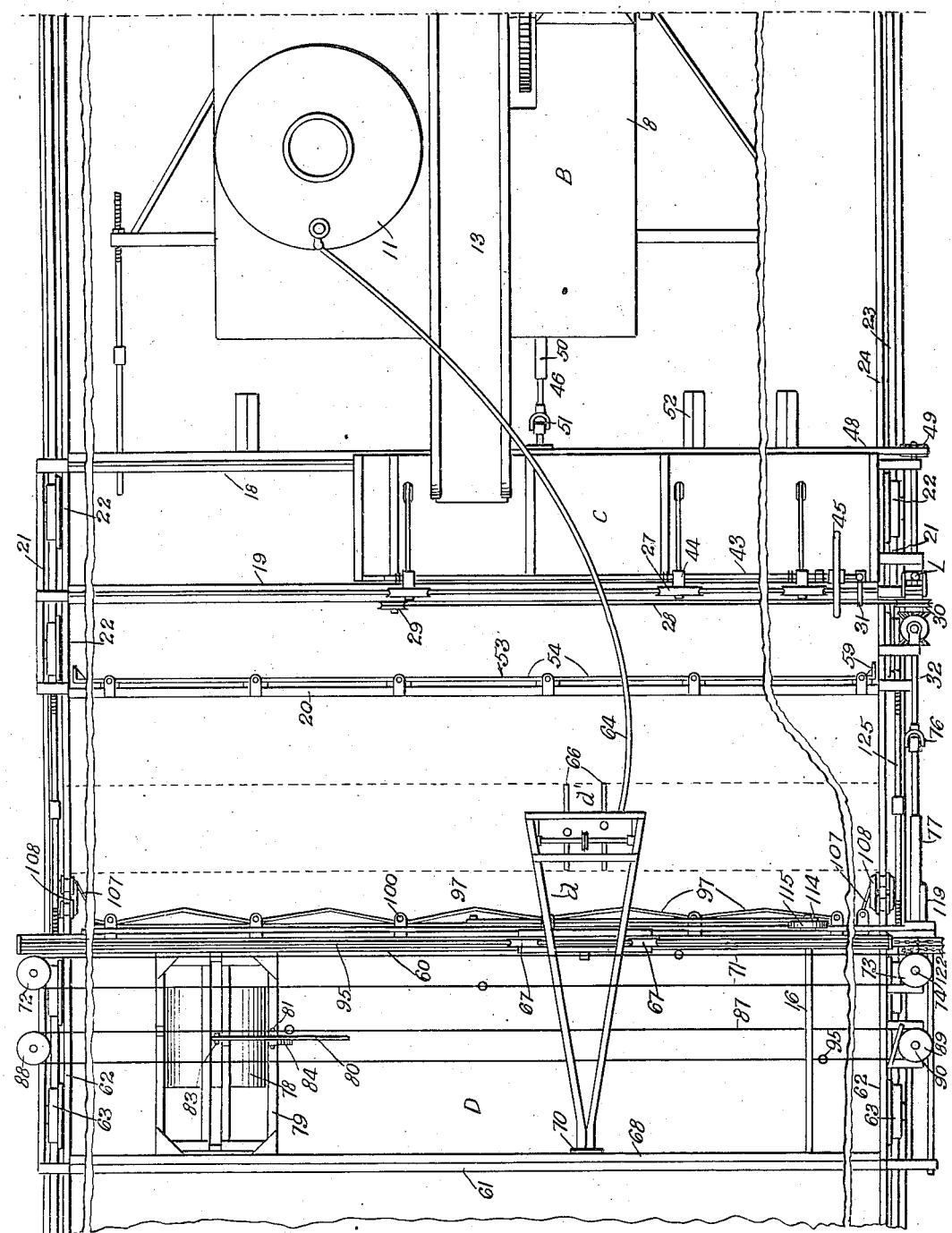

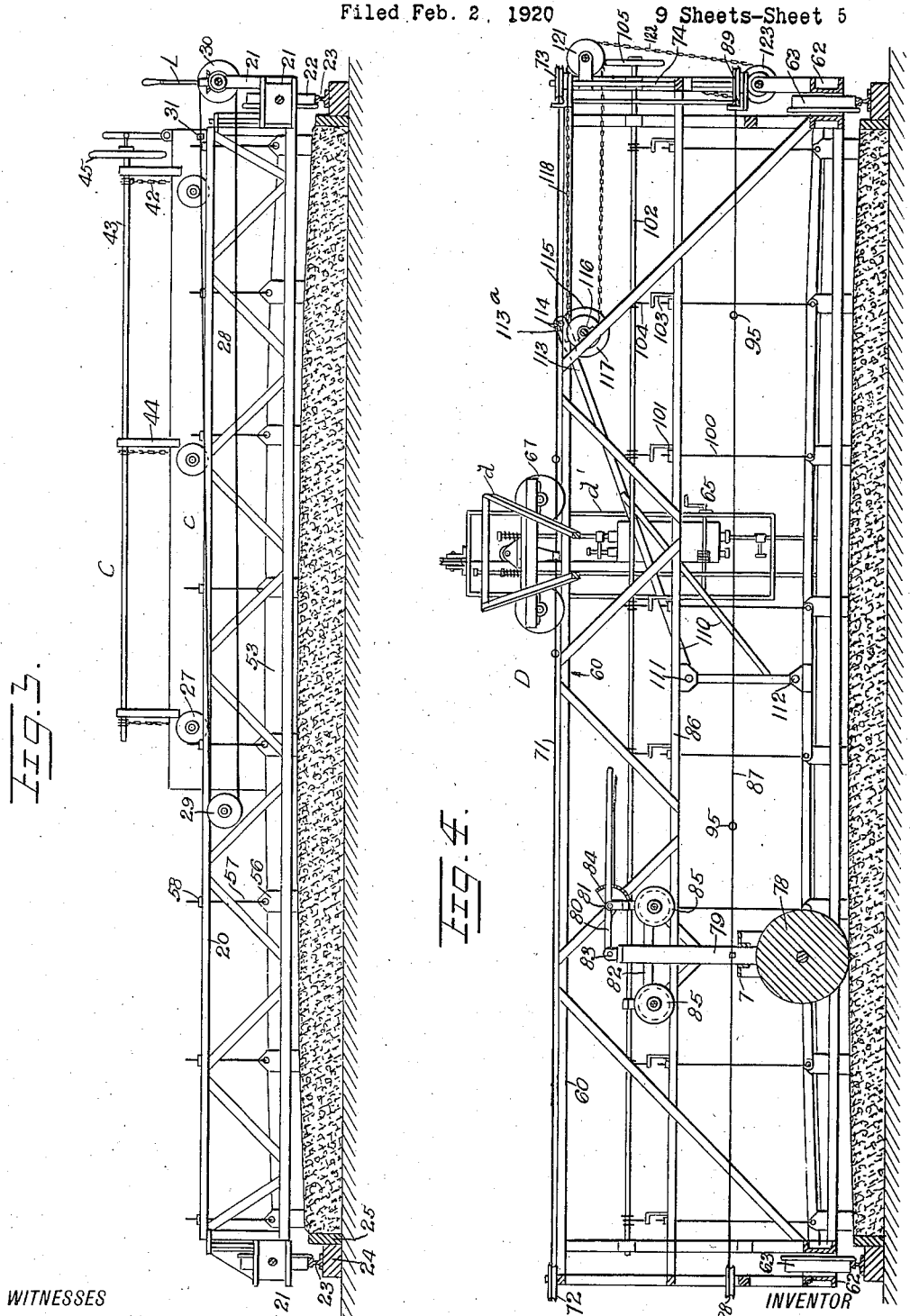

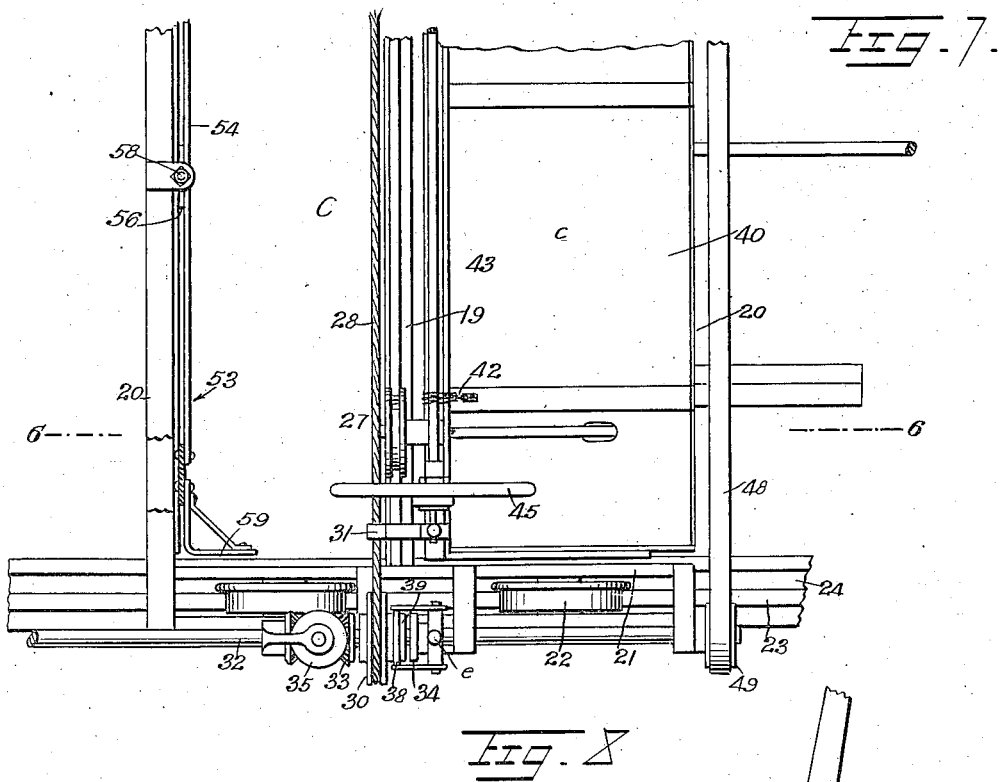

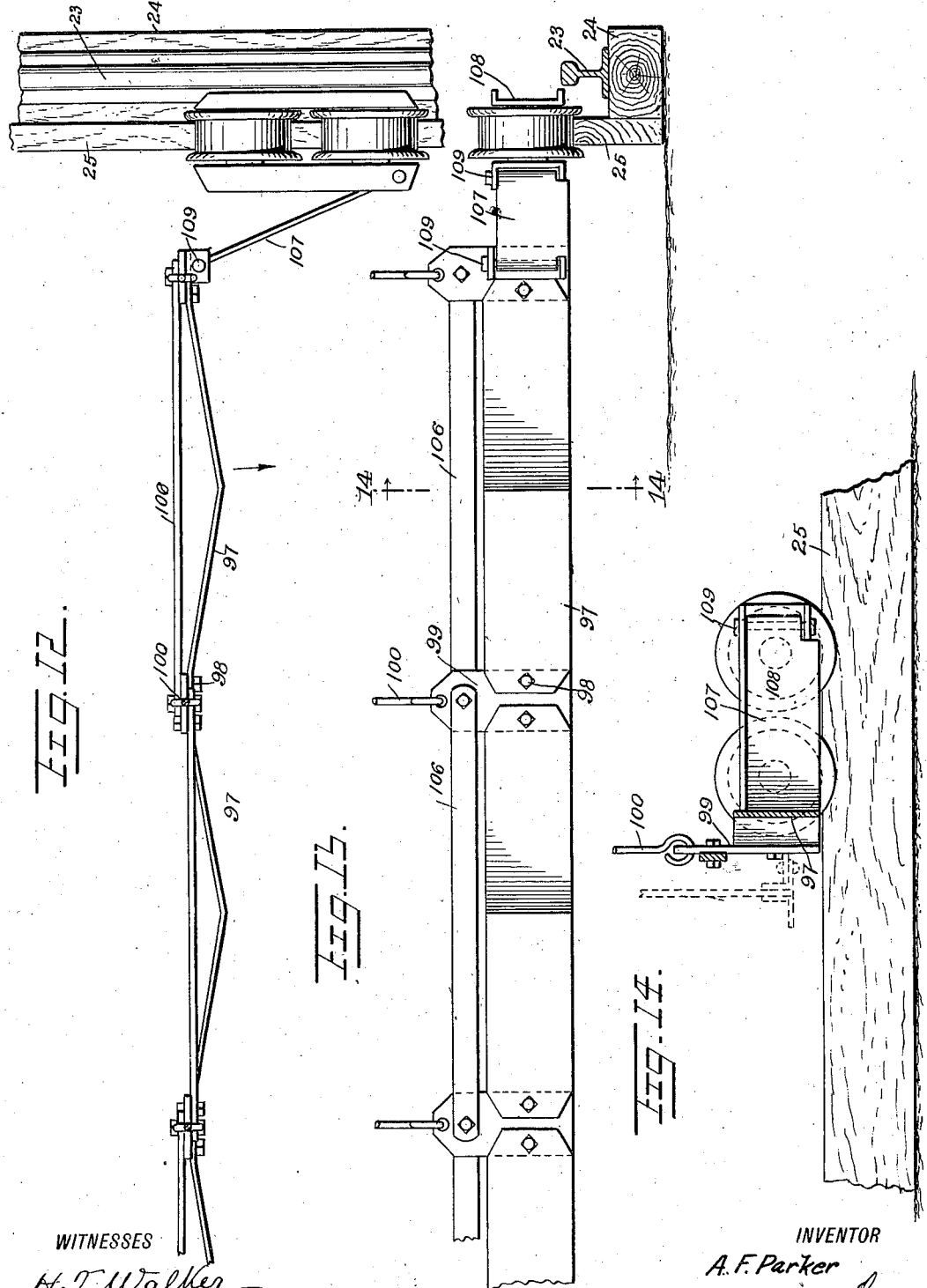

1,514,923

UNITED STATES PATENT OFFICE.

ADELBERT FRANKLIN PARKER, OF OGDEN, UTAH, ASSIGNOR OF ONE-HALF TO PHILIP A. KOEHRING, OF MILWAUKEE, WISCONSIN; WYNNE M. PARKER ADMINISTRATOR OF SAID ADELBERT F. PARKER, DECEASED.

MACHINE FOR BUILDING CONCRETE ROADS.

Application filed February 2, 1920. Serial No. 355,600½.

*To all whom it may concern:*

Be it known that I, ADELBERT F. PARKER, a citizen of the United States, and a resident of Ogden, in the county of Weber and State of Utah, have invented a new and Improved Machine for Building Concrete Roads, of which the following is a full, clear, and exact description.

This invention relates to a machine for building concrete roads of a superior quality by the use of concrete mixed with a minimum quantity of water that results in a dry harsh and hard-to-handle mixture that cannot be handled practically and economically by any present known methods and must be thoroughly tamped to place to produce the desired quality of road body and surface. A co-pending application for a tamper, Serial No. 213505, filed January 24, 1918, relates to a tamper that will effectively do the tamping necessary to make the desired quality of concrete; the present invention provides a reliable, efficient and satisfactory machine which, together with the tamper referred to, embodies a plurality of mechanisms whereby the concrete is mixed, evenly distributed on the sub-grade of the road under construction, roughly leveled, tamped, again leveled, finished, and finally rolled, the making of the road being done in sections or belts extending transversely of the road from one side to the other. The machine is held stationary while the operations of tamping and rolling are being done and then the machine is moved forward, performing the functions of rough leveling and finish leveling to the width of the strip tamped, when the operation of tamping and rolling a new strip of the road begins, the operation of mixing the concrete continuing all the time regardless of the operations of leveling, tamping and rolling, and the machine is adapted to build roads on straight lines or curves and of varying widths.

Another object of the invention is to provide a machine that will make roads of superior quality at the same or less cost than attends the making of such roads by present methods, by providing a road building machine performing the operations necessary in mixing, distributing, leveling, tamping, rolling, and finishing the dry, harsh and hard-to-handle concrete produced by using the small quantity of water necessary to produce the best and strongest concrete, by power-driven mechanisms and instrumentalities making up the machine, wherein all operations possible are automatically performed, thus requiring a minimum of manual control, and preferably the machine is self propelling and is moved forward step by step making the road in transverse strips from side to side of the roadway.

Another object of the invention is to provide a machine composed of a mixing unit, a conveying unit, a distributing and leveling unit, and a tamping, leveling and finish-striking roller unit arranged in train relation in the order mentioned, there being novel means for adjustably connecting the units last three named so as to work on straight or curved stretches of road.

An additional object is to provide a self-propelled machine in which the mixing and conveying units are self-propelled while the distributing and tamping and rolling units are trailed, there being novel means whereby the mixing unit can serve as an anchor by which the conveying unit and the units trailed thereby can be drawn forwardly by a propelling engine on the conveyer unit, so that in this manner a low-powered engine may be employed and a slow, steady and powerful motion is attained.

Another object is to provide adjustable screeds for leveling the concrete for roads of any desired width and with any desired crown.

Still another object is to provide automatic means for causing the concrete tamping mechanism and roller to travel back and forth transversely of the road, power being derived from the engine on the conveying unit.

With such and other objects in view, the invention comprises various novel features of construction and arrangement of parts which will be set forth with particularity in the following description and claims appended hereto.

In the accompanying drawings, which illustrate one embodiment of the invention and wherein similar characters of reference indicate corresponding parts in all the views, Figures 1 and 1ᵃ are side views respectively of the front and rear halves of the machine;

Figures 2 and 2ᵃ are plan views of Figures 1 and 1ᵃ;

Figure 3 is a transverse section on the line 3—3, Figure 1ᵃ;

Figure 4 is a transverse section on the line 4—4, Figure 1ᵃ;

Figure 7 is a plan view of one end of the distributing unit;

Figure 8 is a sectional view of the reversing mechanism for the hoppers of the distributing unit;

Figures 9, 10 and 11 are detail views of the reversing gears for the roller and tamper;

Figure 12 is a fragmentary plan view of the finishing screed;

Figure 13 is a front view of Figure 12;

Figure 14 is a detail sectional view on the line 14—14, Figure 13;

Figures 15, 16 and 17 are detail views of the rough striking screed; and

Figure 18 is a sectional view showing the method of distributing the concrete and leveling the same.

Figure 5:
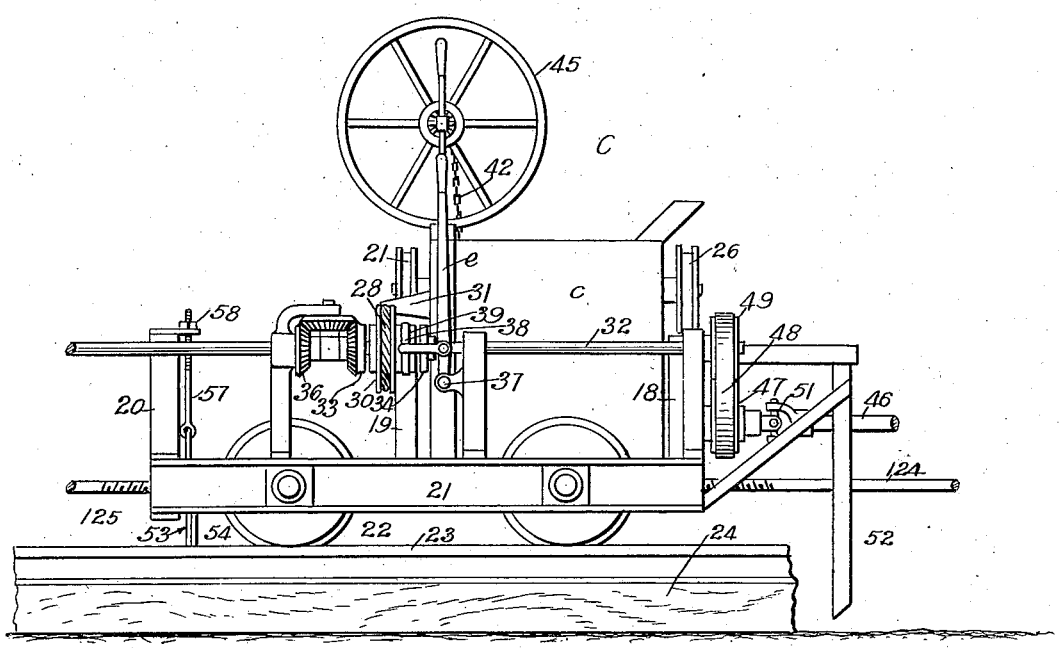
Figure 5 is a side view of the distributing unit.

Referring to the drawings, A designates the mixing unit which is at the front of the machine, B the concrete conveying and traction unit, C the distributing and rough screeding unit, and D the tamping, finish screeding and rolling unit.

The mixer A is a self-propelled vehicle and comprises a frame 1 having front steering wheels 2 and rear traction wheels 3 rolling on the sub-grade, and on the frame is a boiler 4, an engine 5 and a rotary mixing device 6 of usual construction, there being a swinging supply chute 7 by which the materials to be mixed are conducted to the device 6, and a discharge chute 7′ through which the mixed materials pass out of the device. The engine 5 is employed for rotating the device 6, as well as for propelling the mixing unit A.

The conveying unit B is a self-propelled vehicle that includes a frame 8 of suitable construction having front steering wheels 9 and rear driving wheels 10 rolling on the sub-grade, and on the frame is a boiler 11, an engine 12 and an endless conveyer 13 mounted on a frame 14, said conveyer, which is driven by the engine 12, being disposed longitudinally of the machine and extending from the front of the unit to the rear in overhanging relation to the distributing unit C, so that concrete can be deposited by the chute 7′ of the conveyer, which carries it rearwardly to and deposits it into the hopper of the distributing unit C. The conveying unit B is self-propelled by the rear wheels 10 being connected with the engine 12, but when this unit is employed as a tractor for the units C and D, as in moving the machine forwardly after the building of a section or belt of road, it is necessary to employ a greater tractive force. For this purpose a traction cable 15 is utilized in connection with sheaves 16 and 17 on the frames 1 and 8 of the units A and B, respectively, and the free end of the cable is connected with a drum which is driven by the engine 5, so that a slow, powerful, steady, forward motion of the units B, C and D is obtained, it being understood that the unit A is first moved ahead a suitable distance, and then its wheels are blocked so that the unit A will act as an anchor.

Figure 6:
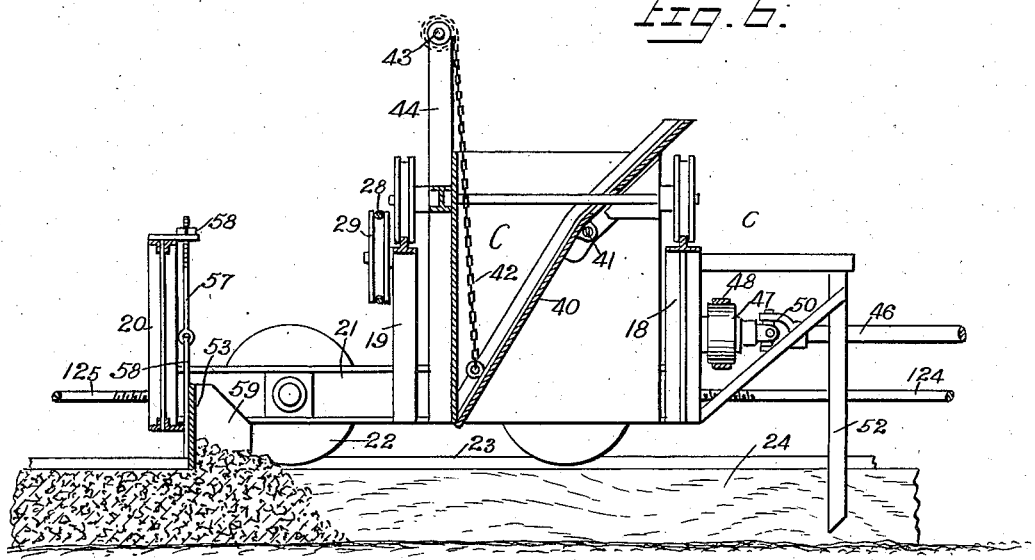
Figure 6 is a section through the distributing unit taken on the line 6—6, Figure 7.

The distributing unit C comprises a pair of trussed spanning beams 18, 19 and 20, which extend transversely to the machine and the full width thereof, the ends of the beams being supported on trucks 21 each having flanged wheels 22 bearing on rails 23, as shown in Figure 3, such rails being supported on timbers 24 which lie just outside the form members 25 that retain the concrete at the edges of the road. The hopper c is of such length as to extend over more than half the width of the machine, so that in either extreme position of the hopper one end thereof will lie under the discharge chute of the mixer and receive mixed concrete. The hopper has grooved wheels 26 and 27 at the front and rear respectively which ride on the top of the beams 18 and 19. The hopper is reciprocated by an endless cable 28 which passes around wheels 29 and 30 mounted respectively on the middle beam 19 and the end frame or truck 21, such cable being fastened at 31, Figures 3 and 7, to the hopper so as to move the latter as the cable travels in one direction or the other. The cable wheel 30 is loosely mounted on a driving shaft 32, as shown in Figure 8, and is adapted to be shifted axially to engage either one of a pair of friction discs 33 and 34, the latter being rigidly fastened to the shaft 32 while the former disc is connected with the shaft 32 through an intermediate bevel gear 35 and a gear 36 fastened to the shaft 32, so that said shaft can rotate the cable wheel 30 in one direction or the other, according to the engagement of the wheel with either friction disc 33 or 34. The cable wheel is shifted by means of a lever L fulcrumed on a suitable support 37 and having a fork 38 which engages in an annular groove 39 in the hub of the wheel 30. An attendant stationed at the end of the distributing unit C manipulates the lever L to cause the hopper to travel back and forth under the discharging chute of the concrete mixer, so that when the hopper is filled it can be dumped to deposit the concrete on the subgrade of the road. As shown in Figure 6, the hopper c has an inclined front side 40 mounted to swing on a horizontal hinge 41 so as to permit the contents of the hopper to drop out. The hinged side of the hopper is connected with chains 42 which pass over a horizontal winding shaft 43 journaled in standards 44 mounted on the hopper, and on one end of the winding shaft 43 is a handwheel 45 whereby the shaft can be manipulated for opening or closing the hopper. The power for reciprocating the hopper is derived from the engine on the conveying unit. For this purpose a shaft 46 extends rearwardly from the unit B and has a pulley 47 around which passes a belt 48 to drive the pulley 49 on the forward end of the shaft 32, as shown in Figures 1ª and 2ª. The shaft 46 has a slip or extension joint 50 and a universal joint 51, so as to provide the necessary flexibility as the relation of the units B and C changes, as in working around a curve in the road.

On the front of the unit C are vertical guide members 52 which serve as means for guiding the placing and holding of line headers or joints wherever they are desired in the road. The joints or headers may be held in place by driving in temporary pins for holding them after the guides move ahead with the machine and until the concrete is placed. By this means the joints and headers will be laid straight and in proper position.

The unit C also includes a rough striking screed 53 which lies to the rear of the hopper c, while the guides 52 are disposed forwardly thereof. This screed is constructed as shown in Figures 15 to 17 inclusive and is composed of a plurality of sheet metal strips 54 disposed in end to end relation with their flat sides in a vertical plane, so that the bottom edges of the sections 54 will form scrapers for leveling the concrete. The ends of the sections 54 are connected by pivots 55 with suspension plates 56 which are supported on rods or equivalent elements 57 that pass through the rear beam 20 and have nuts 58 on their upper ends, whereby the screed can be arched to any desired extent, according to the desired crown of the road, or whereby the entire screed can be lifted to any desired height when not in use. The ends of the screed 53 are curved forwardly to form retaining members 59 for preventing the concrete from working off the forms at the sides of the road.

The rear unit D comprises a pair of spanning beams 60 and 61 which are supported on end trucks 62 which have wheels 63 riding on the truck rails 23, the beams 60 and 61 being higher than the beams of the unit C, so as to support the carriage d for the tamping device d'. The tamping device is the subject matter of a co-pending application Serial Number 213505, filed January 24, 1918, resulting in U. S. Letters Patent #1,329,796, issued Feb. 3, 1920, so that it is unnecessary to describe or illustrate such device in detail. The tamping device is suspended in front of the unit D and is adapted to travel with the carriage d transversely of the road to tamp a strip or section about two feet in width. The boiler of the conveying unit is connected by a flexible hose 64 with the motor 65 of the tamper to reciprocate the tamping blades 66. The tamper carriage d includes a pair of grooved wheels 67 which ride on top of the front beam 60. The rear beam 61 has a pair of horizontal rails 68 and 69 spaced one above the other and between which runs a wheel 70 on the rear end of the carriage d, so that the upper rail supports the tamper in its overhanging relation to the frame of the rear unit. The tamper carriage d is moved back and forth by an endless cable 71 which passes around grooved pulleys 72 and 73 at the ends of the unit D, the grooved pulley 73 being mounted on the upper end of a vertical shaft 74 which receives power from the shaft 32 through a reversing gear 75 which is similar to the reversing gear for the means for operating the roller and will be described later. The shaft 32 extends from the unit C to the unit D and includes a universal joint 76 and a slip joint 77, so as to permit the two units to assume different relations, as in traveling on straight or curved sections of the road. When the tamper reaches the end of its travel in one direction it is automatically reversed and caused to travel in the opposite direction, similar to the action of the roller which compresses the concrete.

The unit D includes a finishing member or roller 78 which is disposed with its axis parallel with the length of the road and is adapted to travel transversely of the latter to roll the concrete which is previously tamped by the tamper. The roller 78 is supported by a vertically movable frame 79 which is suspended from an elevating lever 80 fulcrumed at 81 on a carriage 82 and connected with the frame 79 at 83, there being a locking means 84 for holding the lever in different positions with the roller resting on the concrete or supported above the latter. The carriage 82 has grooved wheels 85 at the front and rear to ride on track rails 86 on the beams 60 and 61. The roller 78 is moved back and forth over the road by means of an endless cable 87 which passes over grooved wheels 88 and 89. The grooved wheel 89 is mounted on a vertical shaft 90, as shown in Figures 9 to 11 inclusive, and on this shaft is a bevel gear 91 which is adapted to engage either of two oppositely disposed bevel gears 92 and 93, the gear 92 being rigidly fastened to the shaft 32 while the gear 93 is loose thereon but receives power from the shaft through an intermediate bevel gear 94, whereby the gears 92 and 93 rotate in opposite directions. The gear 91 is shiftable into engagement with either gear 92 or 93 so as to reverse the rotation of the cable 78, to reciprocate the roller. On the cable are stops 95 so arranged as to cause oscillation of a T-shaped lever 96 when the cable reaches the end of its movement in either direction. This lever 96 is a shifter for the shaft 90, whereby the gear 91 is shifted into engagement with one or the other of the gears 92 and 93. This reversing gearing for the roller cable is similar to the reversing gearing 70 for the tamper. By adjusting the position of the stops 95 the range of movement of the roller or tamper can be varied according to the width of the road being built.

The finishing striking screed is constructed as shown in Figures 12 to 14 inclusive and comprises a horizontal line of strip-like members 97 connected by pivots 98 with suspension plates 99 that are supported on the lower ends of rods 100. These rods pass upwardly through the member 86 of the front beam 60, and on the rods are adjusting nuts 101 for varying the arching of the screed according to the crown desired for the road. The screed can be bodily raised by the turning of a shaft 102 which is mounted in the front beam and is connected with the rods 100 by hangers 103 and winding cables 104, there being a hand-wheel 105 on the end of the shaft 102 for operating the latter. The sections 97 of the screed are inclined forwardly from their ends toward the center at an obtuse angle, so that as the screed is reciprocated longitudinally a better leveling action is obtained. The screed is reinforced by horizontal links 106 which are bolted to the suspension plates 99, whereby stiffness is secured and buckling prevented under the force that imparts the reciprocating motion. At the ends of the screed are outwardly and forwardly inclined members 107 which prevent the concrete from passing over the forms at the edges of the road and which also have a leveling or smoothing action on the concrete. These sections 107 of the screed serve as links for connecting the main part of the screed with trucks 108 which ride on the forms 25, there being hinged joints 109 at the ends of the sections 107, so as to permit the screed to reciprocate. The reciprocation of the screed is effected by a bell-crank lever 110, Figure 4, fulcrumed at 111 on the front beam 60 and pivotally connected at 112 to the center of the screed. The extremity 113 of the bell-crank lever has a slot 113$^a$ into which extends a crank pin 114 on a wheel 115 fastened to a shaft 116, said shaft being provided with a sprocket wheel 117 driven by a chain 118. This chain meshes with a sprocket wheel 119, Figure 1$^a$, on a counter shaft 120, which latter has a sprocket wheel 121 meshing with a sprocket chain 122 that in turn meshes with a sprocket wheel 123 on the shaft 32.

The units B and C and the units C and D are adjustably connected by rods or equivalent elements 124 and 125 having right and left hand threaded connections with the frames of the units at 126, so that by the turning of these rods the units can be adjusted to trail in a straight line or a curved line, according to the line of the road, the said rods serving as links for connecting the units in train relation.

In Figure 18 the hopper c is shown with a charge of concrete $c'$, this charge being supplied by the hopper passing under the rear end of the conveyer. When a uniform depth is obtained in the hopper the attendant manipulates the wheel 45 so as to allow the bottom of the hopper to swing open, as shown by dotted lines Figure 18. The concrete falls upon the sub-grade $c^2$, and the bottom of the hopper is immediately closed so as to receive the concrete being delivered by the conveyer. When the charge is completed the hopper is again opened so that there will be a pile of concrete on the sub-grade extending the full width of the road. The machine is now moved forwardly so that the rough striking screed 53, Figure 18, will level off the pile $c^3$ of concrete to a depth indicated by the line $c^4$. The machine now stops and another pile is deposited, when the machine moves forwardly another step. The roughly leveled concrete is next acted on by the tamper and by the roller, so that the concrete will be compacted to the level $c^5$. It will thus be seen that the road can be built quickly, inexpensively, with a minimum number of hands, and at the same time produce a structure having the best wearing and resisting qualities, this being accomplished by reason of the fact that dry concrete is used and tamped in a special manner by the use of the tamper constructed as set forth in my co-pending application hereinbefore referred to.

From the foregoing description taken in connection with the accompanying drawings, the advantages of the construction and method of operation will be readily understood by those skilled in the art to which the invention appertains, and while I have described the principle of operation, together with the machine which I now consider to be the best embodiment thereof, I desire to have it understood that the machine shown is merely illustrative and that such changes may be made when desired as fall within the scope of the appended claims.

Having thus described my invention, I claim as new and desire to secure by Letters Patent:

1. A road making machine including a plurality of independent frame members mounted to move longitudinally of the road, means for connecting the members in a trailing relation, road making elements upon the different frame members, a power unit upon one of the frame members, and an operative connection between the power unit and the movable road making elements upon the several frame members for driving the same.

2. A road making machine including a plurality of movably mounted frame members, an adjustable trailing connection between the frame members, road making elements upon the different frame members, a power unit upon one of the frame members, and a power shaft driven by the said unit and extending to the different frame members where it is operatively connected to the road making elements, said shaft being provided with compensating joints between the frame members.

3. A road making machine including a plurality of independent movably mounted frame members, a trailing connection between the said frame members, a power unit upon one of the frame members, road making elements upon the different frame members, means for driving the road making elements from the power unit, an anchor member, and a draft connection between the anchor member and one of the frame members, said draft connection being adapted to be driven by the power unit to advance the frame members.

4. A road making machine including a plurality of movably mounted independent frame members, an adjustable trailing connection between the frame members, road making elements upon the several frame members, a power unit upon one of the frame members, a drive shaft driven from the power unit and extending to the several frame members where it has an operative connection with the road making elements, said shaft having compensating joints between the frame members, an anchor member, and draft means associated with the anchor member and adapted to be driven by the power unit for advancing the frame members.

5. A machine for building concrete roads, comprising a frame support movable longitudinally of the road, a mixing machine thereon, a distributing hopper movable on the support transversely of the road to distribute the concrete, a screed arranged behind the hopper to level the concrete, a tamper movable across the road at a point behind the screed to tamp the concrete, a finishing screed disposed behind the tamper, a roller arranged behind the finishing screed, said finishing screed being composed of sections arranged in end to end relation and each section being inclined forwardly from its ends to a central point, and means for reciprocating the screed longitudinally and in a direction transverse to the forward travel of the screed.

6. A road making machine including a frame support movable longitudinally of the road, concrete mixing and depositing means thereon, a tamper movable back and forth across the road, a roller following the tamper and also movable back and forth across the road, a power unit upon the support, and means for driving the before mentioned elements from the power unit.

7. A machine for building concrete roads, comprising means for mixing concrete, a hopper for receiving concrete from the said means, a wheel-supported frame on which the hopper moves back and forth, a rough leveling screed mounted on the frame at a point behind the hopper, a second wheel supported frame connected with the first in a trailing relation thereto, a tamper mounted on the second frame to move back and forth, a roller mounted on the second frame behind the tamper and movable back and forth, and power means upon the frames for advancing the frames and actuating the movable road making elements.

8. A machine for building concrete roads, comprising means for mixing concrete, a hopper for receiving concrete from the said means, a wheel-supported frame on which the hopper moves back and forth, a rough leveling screed mounted on the frame at a point behind the hopper, a second wheel-supported frame connected with the first in a trailing relation thereto, a tamper mounted on the second frame to move back and forth, a roller mounted on the second frame behind the tamper and movable back and forth, a finishing screed mounted on the second frame at a point between the tamper and roller, and power means upon the frames for advancing the frames and operating the movable road making elements.

9. A machine for building concrete roads, comprising a self-propelled vehicle having a concrete mixing apparatus, a self-propelled vehicle having a concrete conveyer, a wheel-supported hopper frame disposed behind the conveyer to receive concrete therefrom, means controlling the hopper to deposit concrete, means behind the hopper for leveling the concrete, means for connecting the hopper frame in trailing relation to the second-mentioned vehicle, a wheel-supported tamper frame arranged behind the hopper frame and connected in trailing relation thereto, a roller associated with the tamper and disposed behind the same, and a draft device between the first and second-mentioned vehicles, whereby the first can act as an anchor while the second-mentioned vehicle pulls itself forwardly together with the hopper, tamper and roller.

10. A road building machine comprising a self-propelled vehicle including a mixing apparatus, a self-propelled vehicle behind the first, a draft device between the two vehicles, whereby the first can act as an anchor while power from the second vehicle acting through the device moves the latter forwardly, and a plurality of wheel-supported road-making devices arranged in train relation behind and connected with the second vehicle.

11. A road building machine comprising a wheel-supported frame adapted to move along the line of the road to be built, a hopper mounted on the frame to move transversely of the road, means for delivering concrete to the hopper, means for opening the bottom of the hopper to deposit the concrete, and a driving means including a reversing mechanism for moving the hopper back and forth.

12. A machine for building concrete roads, comprising a wheel-supported frame adapted to travel step by step along the line of the road to be built, a wheel-supported hopper on the frame and movable transversely to the road, means for controlling the discharge of the concrete from the hopper, means including a mixer for supplying concrete to the hopper, and a screed mounted on the said frame at a point behind the hopper.

13. A road building machine including a frame support movable longitudinally of the road, a mixer thereon, a conveyer thereon receiving material from the mixer, a hopper movable transversely of the support, and receiving the material from the conveyer, a power unit for driving the conveyer and moving the hopper, and means for dumping the hopper at different points in the travel thereof.

14. A machine for building concrete roads, including a supporting structure adapted to be moved along the line of the road to be built, a hopper mounted thereon to move transversely of the road, a joint or header placing guide mounted on the structure at a point in front of the hopper, and a screed mounted on the structure at a point behind the hopper.

15. A machine for building concrete roads, comprising a vehicle having an engine, a wheel-supported structure connected in trailing relation to the vehicle, a movable hopper mounted on the structure for distributing concrete, a transmission mechanism for automatically reciprocating the hopper, and driving means between the said engine and said transmission mechanism.

16. A machine for building concrete roads, comprising a vehicle having an engine, a wheel-supported structure connected in trailing relation to the vehicle, a transversely movable hopper mounted on the structure for distributing concrete, a transmission mechanism for reciprocating the hopper, driving means between the said engine and said transmission mechanism, and a controller for reversing the direction of the movement of the hopper.

17. A machine for building concrete roads, comprising a vehicle having an engine, a wheel-supported structure connected in trailing relation to the vehicle, a hopper mounted on the structure for distributing concrete, and driving means between the said engine and said transmission mechanism, said driving means including universal and slip joints to compensate for different relations between the vehicle and trailing structure.

18. A machine for making concrete roads, comprising a vehicle, a source of mechanical power thereon, a wheel-supported hopper unit adjustably connected to the vehicle in trailing relation thereto, a wheel-supported tamper and finishing unit adjustably connected with the hopper unit in a trailing relation thereto, and a power shaft extending from the said source of power of the vehicle to the two trailing units, said power shaft including flexible and sliding joints between the units and being operatively connected to the movable road making elements thereon.

19. A machine for building concrete roads, comprising a supporting structure movable longitudinally of the road, a tamper movably mounted thereon, a roller movably mounted on the structure, independent traveling carriages on the structure for carrying the tamper and roller respectively, a source of power upon the structure, and an automatically reversible driving means for each carriage receiving power from said source of power.

20. A machine for building concrete roads, comprising a supporting structure movable longitudinally of the road, a tamper movably mounted thereon, a roller movably mounted on the structure, traveling carriages on the structure for carrying the tamper and roller, an automatically reversible driving means for each carriage, a screed between the tamper and roller, and means for longitudinally reciprocating the screed.

21. A machine for building concrete roads, comprising a supporting structure movable longitudinally of the road, a tamper movably mounted thereon, a roller movably mounted on the structure, traveling carriages on the structure for carrying the tamper and roller, an automatically reversible driving means for each carriage, a screed between the tamper and roller, and means for longitudinally reciprocating the screed, said screed being composed of sections hingedly connected together and adjustable to arch the screed.

22. In a machine for building concrete roads, a supporting structure movable longitudinally of the road, a screed thereon composed of pivotally connected sections, means connected with the pivotally connected portions of the sections for independently adjusting the sections to change the curvature of the screed, and means connected with the last mentioned means for bodily adjusting the screed up or down.

23. In a machine for building concrete roads, a supporting structure movable longitudinally of the road, a screed thereon composed of connected sections, each section of the screed being extended forwardly from the ends to the center.

24. In a road building machine, a screed arranged to operate transversely of a subgrade, and comprising a body made of angle shaped forwardly inclining sections arranged end to end to operate crosswise of the subgrade, combined with means to reciprocate the screed so that the angle portions of the sections facilitate spreading of the aggregates struck-off thereby.

25. In a machine for building concrete roads, a supporting structure movable longitudinally of the road, a screed thereon composed of pivotally connected sections, means for independently adjusting the sections to change the curvature of the screed, means for bodily adjusting the screed up or down, means for horizontally reciprocating the screed longitudinally, track-guided trucks, and members pivotally connected with the trucks and with the outermost sections of the screed and inclined forwardly therefrom to scrape the concrete inwardly toward the screed at the ends.

26. In a machine of the class described, a structure extending across a road and movable longitudinally of the road, a hopper movable transversely on the structure from one side to the other, said hopper being of less length than the width of the road, and means at a central point for discharging concrete into the hopper at all times during the travel thereof.

27. In a machine of the class described, a frame mounted to travel longitudinally of the road, a hopper movable thereon from one side of a road to the other for discharging concrete, and relatively fixed means arranged at a central point with respect to the travel of the hopper for supplying concrete thereto, said hopper being movable relatively to said fixed means and including a movable bottom adapted to be opened to permit the concrete to discharge therefrom, and means to reciprocate the hopper.

28. A road making machine including a frame movable longitudinally of the road, a transverse track thereon, a hopper mounted to travel on the track from one side of the road to the other side thereof, means for supplying plastic material to the hopper, and means for moving the hopper back and forth.

29. A road making machine including a frame movable longitudinally of the road, a transverse track thereon, a hopper mounted to travel on the track from one side of the road to the other side thereof, means for moving the hopper back and forth thereon, and means for supplying plastic material to the hopper at any position thereof.

30. In a road building machine, a screed arranged to operate transversely of a roadbed, and end members on the screed extending forwardly in the direction of travel thereof so as to prevent the leveled aggregates from escaping laterally from the subgrade at the sides thereof during the striking-off operation.

31. A road making machine including a pair of frame units movable longitudinally of the road in a traveling relation, a hopper mounted to travel transversely back and forth upon one of the units, means for supplying plastic material to the hopper, compacting means mounted to travel transversely back and forth upon the other unit, a power unit, and means for driving the hopper and compacting means from the power unit.

32. A road making machine including a frame support mounted to move longitudinally of the road, a power unit thereon, a drive shaft receiving power from the unit, a distributing hopper movable transversely of the frame support and having an operative connection with the drive shaft, compacting means following the distributing hopper and movable transversely of the support, said compacting means having an operative connection with the drive shaft, and a reciprocating screed mounted upon the frame support and having an operative connection with the drive shaft.

33. In a machine for building roads, a striking-off screed comprising a series of link like sections pivotally connected at adjacent ends, with supporting means to cause relative movement of the sections and hold them positively in relation to one another after such movement, so that they will conform with the curvature of the crown of the road.

34. In road making machinery, in combination, a self propelled vehicle and drive mechanism thereon, a tamping unit connected with the said vehicle to be moved thereby, means operated from said drive mechanism to cause the tamping unit to operate upon aggregates upon the road-bed transversely of said bed, a finishing member disposed longitudinally of the road-bed in rear of the tamping member, and means operated from said drive mechanism to move the finishing member transversely of the road-bed to finish the road surface as the tampering is completed.

35. In a machine for building concrete roads, a wheel-supported structure, a carriage movable thereon, a roller suspended from the carriage, means for holding the roller in different operating elevations upon the carriage, and means for moving the carriage back and forth.

ADELBERT FRANKLIN PARKER.